United States Patent

Spriggs

[15] 3,696,484

[45] Oct. 10, 1972

[54] BALL MILL CUTTER

[72] Inventor: Frank A. Spriggs, Willoughby, Ohio

[73] Assignee: Pneumo Dynamics Corporation, Cleveland, Ohio

[22] Filed: Feb. 22, 1971

[21] Appl. No.: 117,419

[52] U.S. Cl. ............................................29/105 R
[51] Int. Cl. ..............................................B26d 1/12
[58] Field of Search..29/105 R, 105 A, 103 R, 103 A

[56] References Cited

UNITED STATES PATENTS

| | | | |
|---|---|---|---|
| 3,409,965 | 11/1968 | Fisher | 29/103 |
| 2,517,970 | 8/1950 | Buchanan | 29/105 X |

*Primary Examiner*—Leonidas Vlachos
*Attorney*—Stephen M. Mihaly

[57] ABSTRACT

Ball mill cutter includes plural cutting blade inserts retained in circumferentially spaced slots in the forward end of the tool body, such slots having a flat bottom wall extending rearwardly at an angle from the tip of the tool body to the outer periphery thereof. The bottom edge of the blade inserts is also flat for mating engagement with the bottom wall of the angular slots, and the outer edge of each blade insert is contoured to provide a cutting edge projecting radially outwardly beyond the outer periphery of the tool body substantially to the same extent along the full length thereof except adjacent the axis of rotation of the tool body where the blade inserts have a flat portion extending perpendicular to the bottom edge which terminates the forwardmost portion of the cutting edge radially outwardly from the rotational axis of the tool body.

10 Claims, 4 Drawing Figures

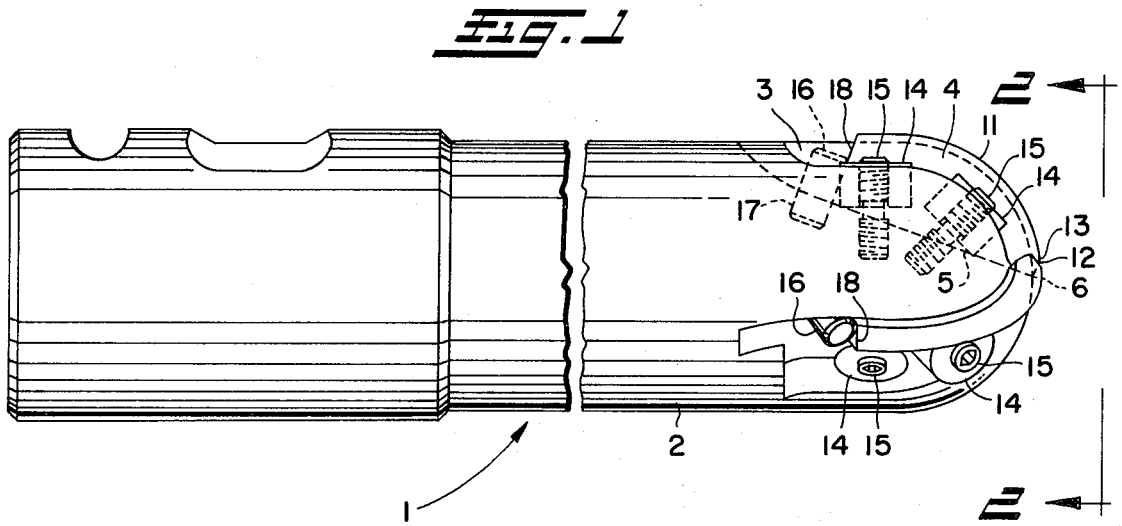
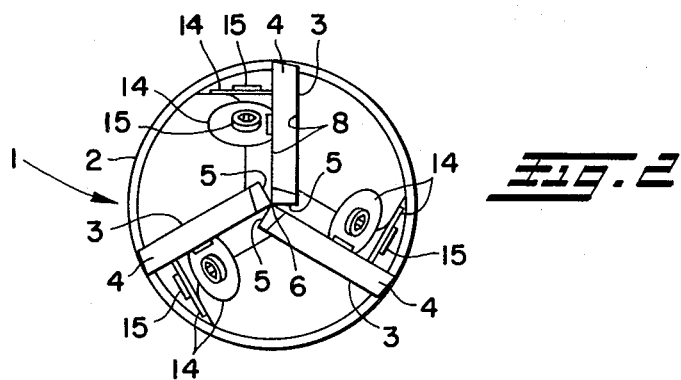
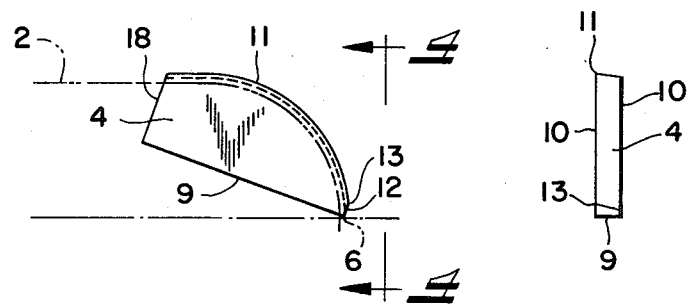
INVENTOR.
FRANK A. SPRIGGS
BY
Oberlin, Maky, Donnelly & Renner
ATTORNEYS

BALL MILL CUTTER

BACKGROUND OF THE INVENTION

This invention relates generally as indicated to a ball mill cutter with plural cutting blade inserts which more effectively cut flats and the like at substantially increased feed rates.

Previous known ball mill cutters made of high speed steel cannot effectively cut on center, since the cutting edges have very little velocity in the region of the rotational axis of the tool. Accordingly, when the cutter reaches the bottom of a machined cut-out section, the flat portion is removed more by a scrubbing action than by cutting. The same is true even if the cutter is provided with overlapping flutes. The result is that the cutter is limited to relatively low feed rates (between approximately 2 to 3 inches per minute), and the cutter also requires frequent sharpenings to cut a flat, which further adds to the time and expense of machining a part.

SUMMARY OF THE INVENTION

It is accordingly a principal object of this invention to provide a ball miller cutter which utilizes a unique arrangement of cutting blade inserts to permit a substantial increase in the feed rate of the cutter.

Another object is to provide such a cutter which effectively cuts flats with minimum wear of the cutting edges.

These and other objects of the present invention may be achieved using a ball mill cutter with plural cutting blade inserts received in uniformly circumferentially spaced slots in the tool body. The slots have a bottom wall extending rearwardly at an angle from the tip of the tool body at which point one edge of each bottom wall desirably intersects the axial center line of the tool body. The bottom edge of the blade inserts is also desirably flat for mating engagement with the bottom wall of the angular slots, and the outer edge of the blade inserts is contoured to provide a cutting edge projecting radially outwardly beyond the outer periphery of the tool body desirably substantially to the same extent along the full length thereof. However, in the region of the tip of the tool body the cutting blade inserts have a flat adjacent the axis of rotation of the tool body extending perpendicular to the bottom edge thereof thus providing the forwardmost portion of the cutting edge radially outwardly of such rotational axis. Suitable clamps are used to hold the cutting blade inserts in position within the slots, and a stop pin is provided adjacent the rear edge of the inserts to prevent axial rearward movement of the inserts during cutting.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a fragmentary side elevation view of a preferred form of ball mill cutter constructed in accordance with this invention;

FIG. 2 is an end elevation view of the ball mill cutter of FIG. 1 as seen from the plane of the line 2—2 at the right end of FIG. 1;

FIG. 3 is a side elevation view of one of the cutting blade inserts for the ball mill cutter of FIGS. 1 and 2; and FIG. 4 is an end elevation view of the cutting blade insert of FIG. 3 as seen from the plane of the line 4—4 at the right end of FIG. 3.

DESCRIPTION OF THE PREFERRED EMBODIMENT

Referring now in detail to the drawing and initially to FIGS. 1 and 2 thereof, there is shown a preferred form of ball mill cutter 1 in accordance with this invention including a generally cylindrical tool body 2 suitably notched at one end for mounting in the spindle of a machine tool or the like. The other end of the tool body 2 is desirably rounded and is provided with a plurality of uniformly circumferentially spaced slots 3 therein for receipt of cutting blade inserts 4 made of tungsten carbide or other suitable hard cutting material.

Preferably, there are three such slots 3 with carbide inserts 4 therein uniformly circumferentially spaced around the outer periphery of the cutting tool body 2, and each slot is milled at an angle desirably of approximately 15° to the rotational axis of the tool body to provide a flat bottom wall 5 extending rearwardly at an angle from the tip 6 of the tool body to the outer periphery thereof. At the very tip of the tool body one edge of the bottom wall 5 of each slot 3 desirably intersects the rotational axis of the tool body as shown in FIG. 2. The side walls 8 of the slots 3 are also flat and parallel to the rotational axis of the tool body.

The cutting blade inserts 4, one of which is shown in detail in FIGS. 3 and 4, are of a shape similar to the slots 3, being provided with a flat bottom edge 9 and flat sides 10 for mating engagement with the flat bottom edge 5 and side walls 8, respectively, of the slots. Moreover, the outer edge 11 of the blade inserts 4 are contoured and relieved as shown to provide a cutting edge projecting radially outwardly beyond the outer periphery of the tool body 2 when disposed in the slots 3 approximately to the same extent substantially the full length thereof. However, as clearly shown in FIGS. 1 and 3, adjacent the rotational axis of the tool body the outer edge 11 of the blade inserts 4 has a flat portion 12 extending at right angles to the bottom edge 9 of the blade inserts 3 to locate the forwardmost portion 13 of the cutting edge 11 radially offset from the axis of rotation of the tool.

To retain the carbide inserts 4 within the respective slots 3 in tool body 2, one side of each slot is desirably relieved along the length thereof as shown in FIGS. 1 and 2 to expose a portion of one side of the carbide inserts for clamping engagement by one or more wedge clamps 14 (two being preferred as shown) suitably fastened to the cutting tool body by screws 15. Rearward movement of the carbide inserts 4 within their respective slots 3 during use of the tool is precluded by a stop pin 16 or the like received in a bore 17 in the tool body adjacent the back edge 18 of each carbide insert which is also desirably flat and perpendicular to the bottom edge 9 as shown. As the carbide inserts 4 become worn, they may readily be removed from the respective slots 3 by loosening the wedge clamps 14 and reground or discarded and replaced by new inserts as desired.

Such an arrangement of blade inserts 4 in the tool body 2 effectively eliminates the scrubbing action which occurs during cutting of a flat portion by a conventional ball end mill made of high speed steel, and also permits a substantial increase in the feed rate of the tool from approximately 2 to 3 inches/min. to 12 to 14 inches/min. without the need for having to continuously sharpen the cutting edges as was previously required.

The embodiments of the invention in which an exclusive property or privilege is claimed are defined as follows:

1. A ball mill cutter comprising a tool body rounded at one end, a plurality of circumferentially spaced longitudinally extending slots in said tool body intersecting the tip of said one end, and blade inserts in said slots, said blade inserts having contoured outer edges providing cutting edges projecting radially outwardly beyond the outer periphery of said tool body, said outer edges being relieved adjacent the rotational axis of said tool body in the region of said tip to locate the forwardmost portion of said cutting edges radially outwardly of such rotational axis, and means for retaining said blade inserts in said slots.

2. The cutter of claim 1 wherein there are three of said slots uniformly circumferentially spaced around the periphery of said tool body each containing a blade insert.

3. The cutter of claim 1 wherein said slots extend rearwardly from said tip at an angle to the outer periphery of said tool body, said slots having a flat bottom wall and flat sides for mating engagement by the bottom edge and sides of said blades which are also flat.

4. The cutter of claim 3 wherein one edge of the bottom wall of said slots intersects the rotational axis of said tool body at said tip.

5. The cutter of claim 3 wherein said outer edge of each of said blades is relieved by providing a flat on said blades adjacent the rotational axis of said tool body extending rearwardly at an angle to such rotational axis.

6. The cutter of claim 5 wherein each of said flats is perpendicular to the bottom edge of the respective blade inserts.

7. The cutter of claim 1 wherein said means for retaining said blade inserts in said slots comprises clamp means fastened to said tool body for engagement with one side of said blades.

8. The cutter of claim 7 wherein one side of each of said slots is relieved to expose a portion of one side of said blade inserts for engagement by said clamp means.

9. The cutter of claim 7 wherein there are two of said clamp means engaging each of said blade inserts.

10. The cutter of claim 7 further comprising a stop pin inserted in said tool body adjacent the rear edge of each of said blade inserts to prevent rearward movement of said blade inserts within said slots.

* * * * *